United States Patent
Jelinek et al.

(10) Patent No.: US 6,755,656 B2
(45) Date of Patent: Jun. 29, 2004

(54) METHOD AND APPARATUS FOR ADAPTIVE HANDWRITING TEACHING SYSTEM

(75) Inventors: Lenka M. Jelinek, Hillsboro, OR (US); Frank T. Brown, Beaverton, OR (US); William C. DeLeeuw, Portland, OR (US)

(73) Assignee: Intel Corporation, Santa Clara, CA (US)

(*) Notice: Subject to any disclaimer, the term of this patent is extended or adjusted under 35 U.S.C. 154(b) by 46 days.

(21) Appl. No.: 09/971,174

(22) Filed: Oct. 4, 2001

(65) Prior Publication Data

US 2003/0067465 A1 Apr. 10, 2003

(51) Int. Cl.[7] .............................................. G09B 11/00
(52) U.S. Cl. ........................ 434/162; 434/85; 434/88; 434/159; 434/160; 434/163; 434/165; 434/161; 434/162; 345/156; 345/104; 345/102
(58) Field of Search ........................ 434/85, 88, 158, 434/159, 160, 163, 165, 161, 162; 345/173, 156, 102, 103, 104

(56) References Cited

U.S. PATENT DOCUMENTS

| | | | | |
|---|---|---|---|---|
| 4,464,118 A | * | 8/1984 | Scott et al. ............... | 434/85 X |
| 4,633,436 A | * | 12/1986 | Flurry ....................... | 345/179 |
| 4,690,644 A | * | 9/1987 | Flanders et al. .......... | 434/158 X |
| 4,793,810 A | * | 12/1988 | Beasley, Jr. .............. | 434/165 X |
| 5,007,085 A | | 4/1991 | Greanias et al. | |
| 5,100,329 A | * | 3/1992 | Deesen et al. ........... | 434/327 X |
| 5,296,963 A | * | 3/1994 | Murakami et al. ....... | 359/389 X |
| 5,397,865 A | * | 3/1995 | Park ........................ | 178/18.05 X |
| 5,730,602 A | * | 3/1998 | Gierhart et al. .......... | 434/155 X |
| 5,874,722 A | | 2/1999 | Rando et al. | |
| 5,911,533 A | | 6/1999 | Fassler et al. | |
| 6,215,901 B1 | * | 4/2001 | Schwartz ................. | 382/186 X |
| 6,304,667 B1 | * | 10/2001 | Reitano .................. | 382/128 X |
| 6,373,492 B1 | | 4/2002 | Kroitor | |
| 6,515,654 B1 | | 2/2003 | Liao | |
| 6,535,204 B2 | * | 3/2003 | Sun ......................... | 345/173 X |
| 6,544,902 B1 | * | 4/2003 | Farnworth .............. | 438/781 X |
| 6,572,378 B1 | * | 6/2003 | Rehkemper et al. ...... | 434/85 X |
| 2002/0160342 A1 | * | 10/2002 | Castro ..................... | 434/159 |

FOREIGN PATENT DOCUMENTS

JP 409222846 A * 8/1997 ............ G09B/7/02

* cited by examiner

*Primary Examiner*—S. Thomas Hughes
*Assistant Examiner*—Chanda Harris
(74) *Attorney, Agent, or Firm*—Blakely, Sokoloff, Taylor & Zafman LLP

(57) ABSTRACT

One aspect of the invention relates to an electronic writing device for interactive teaching of users to reproduce a selected graphical representation. The electronic writing device comprises a casing, a screen and internal logic placed within the casing. The internal logic controls adjustment of a light beam directed at a bottom surface of the screen to temporarily illuminate one or more light segments, visible on a top surface of the screen, in efforts to guide a user in writing the graphical representation.

21 Claims, 3 Drawing Sheets

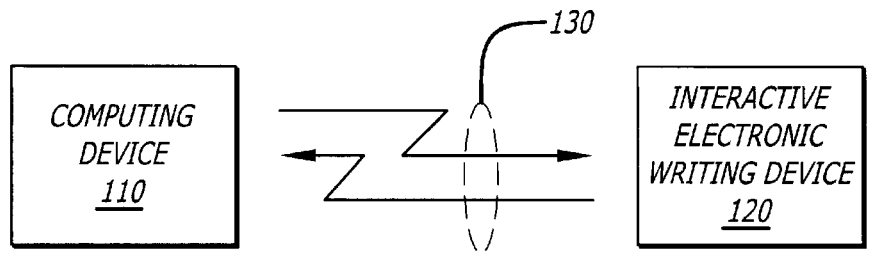
FIG. 1
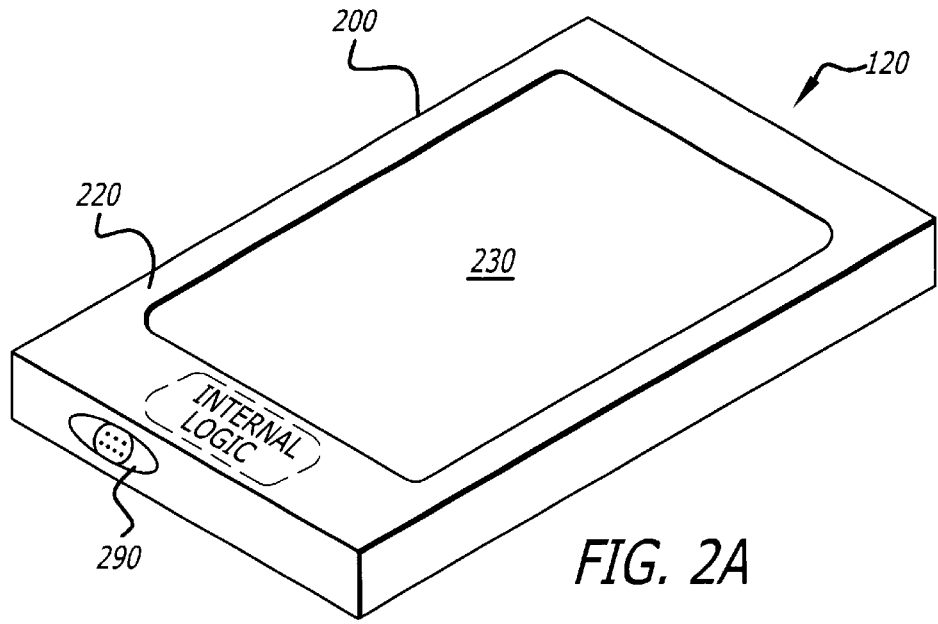
FIG. 2A
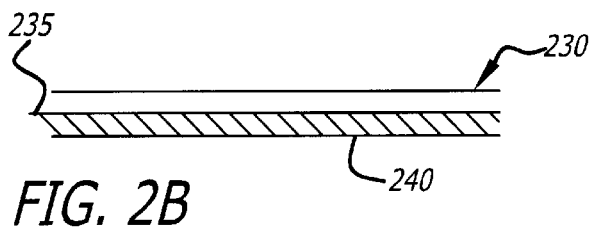
FIG. 2B
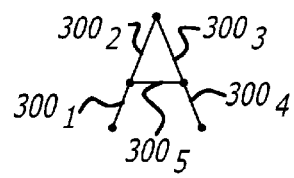
FIG. 3A
FIG. 3B

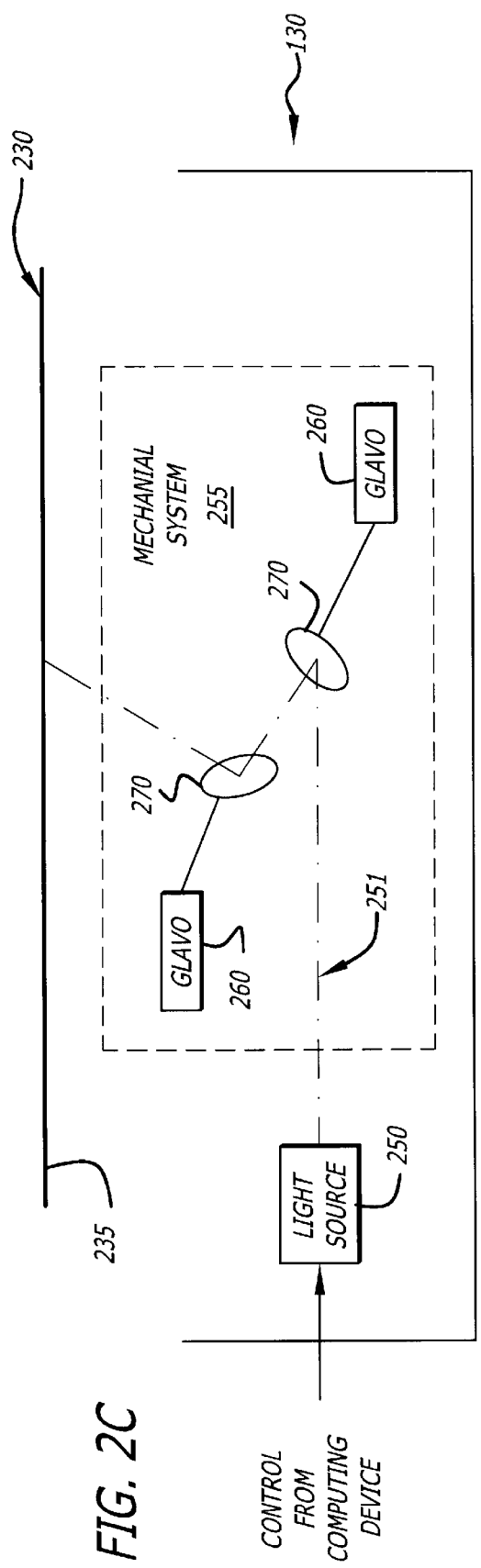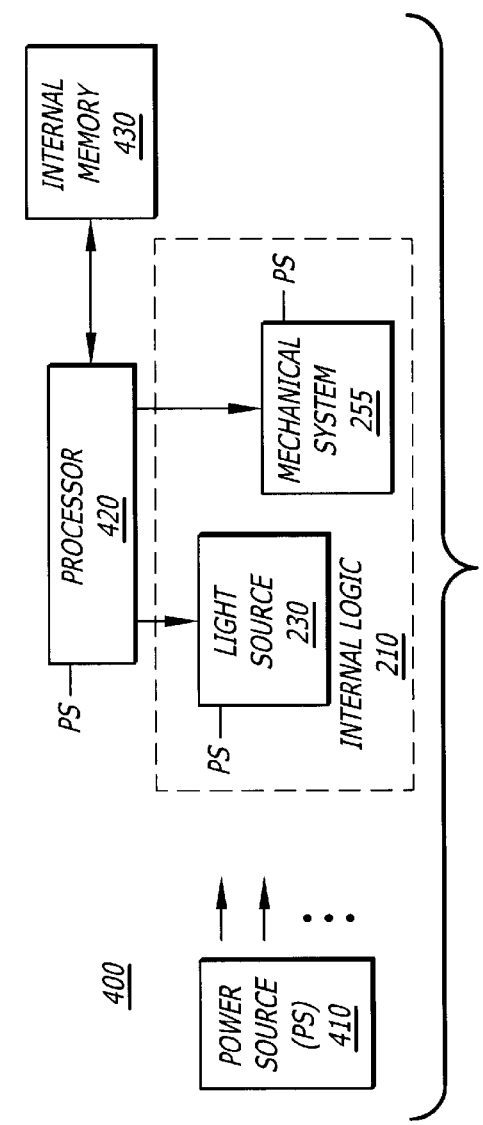

METHOD AND APPARATUS FOR ADAPTIVE HANDWRITING TEACHING SYSTEM

FIELD

The invention generally relates to the field of educational electronic devices. In particular, one embodiment of the invention relates to method and electronic device for interactively guiding a user through proper handwriting or drawings techniques.

GENERAL BACKGROUND

Over the past decade, educators an parents have relied more and more on supplemental teaching tools. One of these supplemental teaching tools involves educational software that displays alphanumeric text (e.g., characters and numbers) on a monitor screen of the computer, requiring a user to reproduce the displayed text on paper at a separate writing area. This supplemental teaching tool has a number of disadvantages.

For instance, there is a distal disparity from the monitor screen where the text is displayed to the writing area. For children learning to write, this may cause learning difficulties by continually forcing the child to write the displayed text from memory. Another disadvantage with the supplemental teaching tool described above is that it is not interactive, and thus, fails to provide a mechanism for guiding the user in reproducing the displayed text. Such guidance would be useful in teaching proper handwriting techniques and would enable users to learn to draw images with higher degrees of complexity than simple alphanumeric text.

In effort to overcome some of the above-stated disadvantages, companies have previously developed a computer peripheral tablet that features a 9×9 matrix grid of light emitting diodes (LEDs). In response to computer control signals, certain LEDs are illuminated to display a selected letter or number. This enables the user to reproduce the letter by writing on paper situated at a separate, non-interactive writing area of the tablet, but in close proximity to the displayed text or image. Unfortunately, the LED grid again fails to provide an interactive, handwriting or drawing mechanism that guides the user in reproducing the displayed text or image. Also, the use of grids cannot clearly convey to the user proper curvature found in some alphanumeric text especially cursive handwriting and images.

BRIEF DESCRIPTION OF THE DRAWINGS

The features and advantages of the invention will become apparent from the following detailed description of the invention in which:

FIG. 1 is an exemplary block diagram of a first embodiment of an interactive, electronic writing device adapted to a computer.

FIG. 2A is a first exemplary embodiment of the interactive electronic writing device of FIG. 1.

FIG. 2B is an exemplary embodiment of a screen of the interactive electronic writing device of FIG. 2A having a bottom side with a thermochromatic film or phosphorous coating.

FIG. 2C is an exemplary embodiment of internal logic employed within the interactive electronic writing device of FIG. 2A.

FIGS. 3A and 3B are exemplary embodiments of a progressive active vector light segment associated with an alphanumeric character produced on a surface of the interactive, electronic writing device.

FIG. 4 is a second exemplary embodiment of internal hardware of the interactive electronic writing device of FIG. 1.

DESCRIPTION

Figure 5:
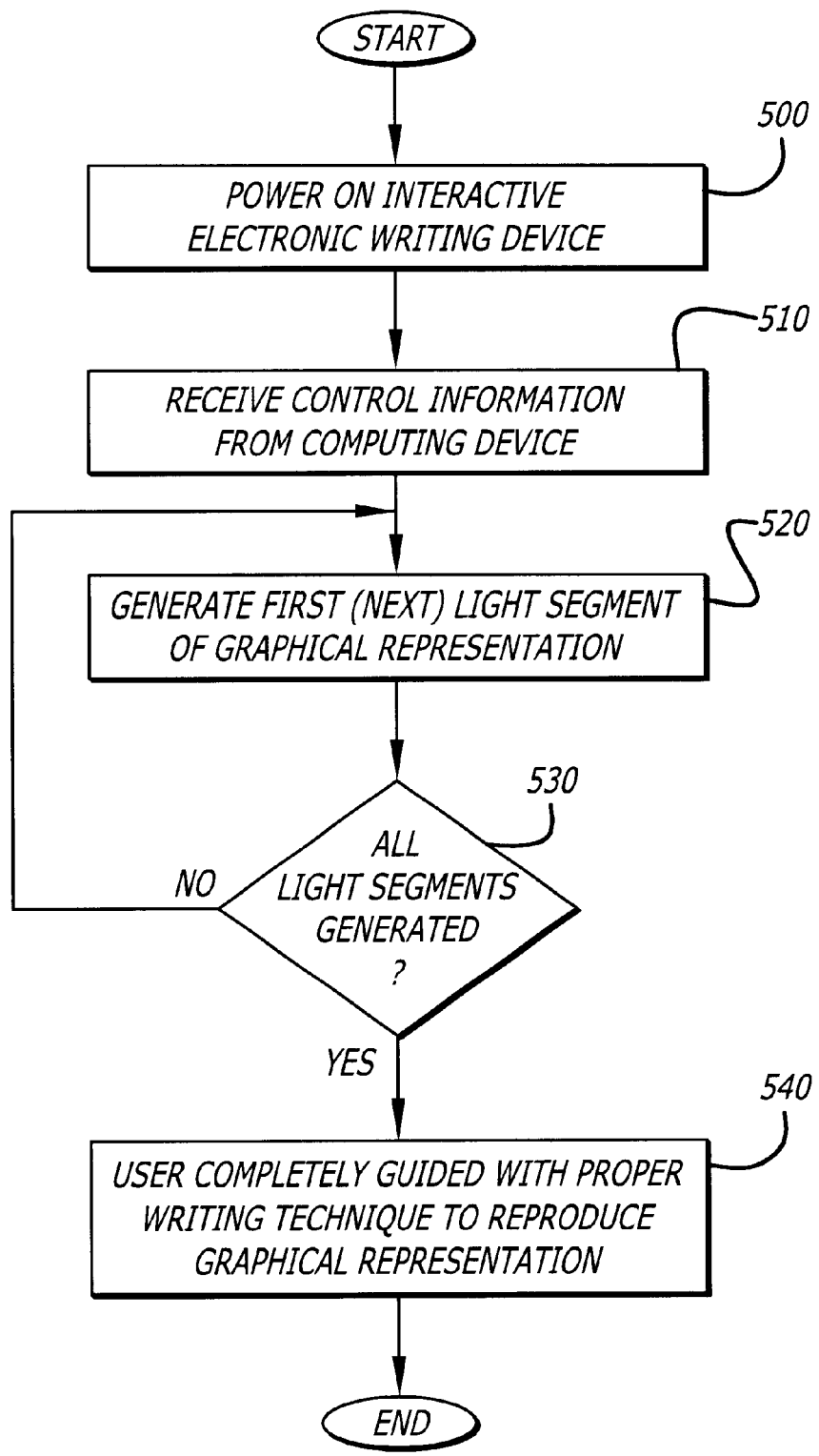
FIG. 5 is an exemplary block diagram of a flowchart featuring the operations of the interactive electronic writing device of FIG. 2C or 4.

In general, one embodiment of the invention generally relates to a method and electronic device for interactively guiding a user through proper handwriting or drawings techniques. For clarity, the term "writing" and other related tenses used herein involves the act of handwriting and/or drawing. Also, certain details are set forth below in order to provide a thorough understanding of the invention, albeit the invention may be practiced through many embodiments other that those illustrated. Well-known circuits and operations are not set forth in detail in order to avoid unnecessarily obscuring the invention.

In the following description, certain terminology is used to describe certain features of the invention. For example, "a computing device" includes logic being hardware, firmware, software module(s) or any combination thereof that performs a desired function. In one embodiment, the computing device is a computer such as a desktop computer, laptop computer, hand-held (e.g., personal digital assistant), a mainframe, a workstation, a server or any other computer architecture. Other examples of a computing device include, but are not limited or restricted to other communication equipment such as an alphanumeric pager, a facsimile machine, a set-top box or a wireless telephone for example.

A "software module" is code that, when executed, performs a certain function. Examples of such code include an operating system, an application, an applet or even a series of code instructions. One or more software modules may be stored in a machine readable medium, which includes but is not limited to an electronic circuit, a semiconductor memory device, a read only memory (ROM), a flash memory, a type of erasable programmable ROM (EPROM or EEPROM), a floppy diskette, a compact disk, an optical disk, a hard disk, and the like.

In addition, a "link" is generally defined as one or more physical or virtual information-carrying mediums to establish a communication pathway. Various types of mediums include, but are not limited or restricted to a cable, electrical wiring, wall socket adapters interconnected by alternating current (AC) wiring, or perhaps air in combination with wireless signaling technology employed at the computing device and/or an interactive electronic writing device. Examples of "wireless signaling" include radio frequency (RF), infrared, and the like.

Referring to FIG. 1, an exemplary block diagram of a first embodiment of an educational tool 100 featuring an interactive, electronic writing device 120 adapted to a computing device 110 is shown. Herein, the computing device 110 and the interactive electronic writing device 120 are in communication over a link 130. The selected type of link for this embodiment features one or more wireless communication channels to support RF signaling in a unidirectional or in a bidirectional fashion, as represented. Of course, the link 130 may be selected as a wired communication path for other embodiments. The computing device 110 fully controls the generation of progressive active vector light segments that collectively form a graphical representation such as alphanumeric text, images or symbols as described below.

As shown in FIG. 2A, one embodiment of the writing device 120 comprises a casing 200 made of a rigid material such as hardened plastic. The casing 200 protects internal logic 210 employed within the casing 200 from damage caused by environmental conditions. One surface 220 of the casing 200 features a screen 230 made of a semi-opaque material having a translucent or transparent quality (e.g., plastic, glass, etc.). The screen 230 is sized to accommodate an overlay of standard letter size paper (8.5"×11"), although other sized screens may be implemented as an alternative.

As an optional feature, as shown in FIG. 2B, a phosphorous coating or film 240 may be applied to a bottom surface 235 of the screen 230 to temporarily maintain luminance for a prolonged period of time. The film 240 may be applied through a lamination process or through another application technique. For instance, the film 240 may be thermochromatic in nature so that directing a light beam to a region of the film 240 causes the temperature of that region to rise above its ambient temperature. This temporarily alters the color of the film 240 for a prescribed period of time until the film 240 returns to its ambient temperature.

According to one embodiment, as shown in FIG. 2C, the internal logic 210 comprises a light source 250 that emits a beam of light. The light source 250 may be a laser or a light emitting diode (LED) that produce a light beam 251 having minimal dispersion. Of course, the light source 250 may further include lenses and filters for regulating and directing the light beam.

A mechanical system 255 is placed within the casing 200 to control the direction and visual perception of the light beam 251 on the screen 230. One of many types of mechanical systems for accomplishing this operation includes a combination of one or more galvanometers 260 and one or more mirrors 270. In one embodiment, one galvanometer 260 is used to control a mirror for horizontal adjust of the light beam 251 while another galvanometer controls a mirror for vertical adjustment of the light beam 251.

Collectively, the galvanometers 260 and mirrors 270 reflect the light beam 251 toward the bottom surface 235 of the screen 230 or alternatively the phosphorous coating or thermochromatic film. For this embodiment, the galvanometers 260 are fully controlled by the computing device 110 to appropriately adjust the mirrors 270 to progressively produce active vector light segments visible from the screen 230. This enables the user to write graphical representations either on paper positioned over the screen 230 or on the screen 230 itself using a writing instrument such as a dry-erasable marker, a stylus and the like.

In combination with the mechanical system 255, the light source 250 may feature a Fresnel lens. The Fresnel lens would be adapted to bend the light beam 351 to correct distortion inherent to angle beam projection. Also, a light detector may be used to calibrate light steering components (e.g., mirrors 270, galvanometers 260, etc.) to facilitate a more accurate and detailed graphical representation on the screen 230.

Referring now to FIGS. 3A and 3B, exemplary embodiments of the generation of progressive active vector light segments is shown. In general, progressive active vector light segments $300_1$–$300_M$ (M>1) are visible from the screen 230 of the interactive electronic writing device 120 and collectively form a graphical representation. A "light segment" is a sequence of illuminated reference points that collectively form a portion of a graphical representation. For instance, a light segment may be representative of a line with or without curvature that forms the graphical representation. The length of each light segment may vary.

Produced by the light source 250 and mechanical system 255 of FIG. 2, each of the progressive active vector light segments $300_1$, $300_2$, $300_3$, $300_4$, $300_5$ is generated and displayed in succession in order to emulate a proper writing technique for reproduction of the graphical representation as shown in FIG. 3A.

For instance, in one embodiment, the most recently generated light segment $300_5$ may have the highest degree of illumination while the prior light segments $300_1$, $300_2$, $300_3$, $300_4$ may have varying degrees of illumination, where the first light segment $300_1$ has the least degree of illumination as shown in FIG. 3B. Successive display of the light segments $300_1$–$300_5$ enables the user to learn how to correctly reproduce the graphical representation such as (i) handwriting in any case (upper/lower) or style (cursive or printed) and in accordance with any character type (e.g., Roman, Kanji, Arabic, Chinese, etc.), or (ii) drawing images such as geometrical objects, cartoon characters, artistic renderings, and the like.

It is contemplated that a future light segment to be displayed next may be dimly displayed. This serves as a preview of the next handwritten stroke by the user. Also, it is contemplated that it may be advantageous to vary the illumination for different lights segments (e.g., future, current or even previously generated light segments) to perhaps focus the attention of the user. Thus, repeated applications of the light beam to the surface may occur where the relative brightness of each ensuring light segment is dependent on the rate at which the light beam is used to rewrite that segment.

Referring back to FIG. 2A, a side surface 205 of the casing 200 enables a connector port 290 to be accessible through the casing 200. For instance, in one embodiment, the connector port 290 may be configured as a Universal Serial Bus (USB) port that supports "plug and play" operations. Alternatively, the connector port 290 may be a serial port or a parallel port for direct communications with the computer 110 of FIG. 1 or perhaps a network adapter that enables communication with the link 130 being part of a network (e.g., Ethernet adapter). Of course, multiple connector ports may be provided to support different types of adapters.

Referring to FIG. 4, an exemplary block diagram of a second embodiment of an interactive, electronic writing device adapted to a computer is shown. Similar to FIG. 1, the interactive electronic writing device 400 is in communication with the computing device over the link and includes the internal logic 210 (e.g., light source 250, mechanical system 255, etc.). However, the computing device does not directly control the operations of the light source 250 and mechanical system 255. Instead, the operations of the interactive electronic writing device 400 are controlled by the internal logic of which the hardware comprises an independent power source 410, a processor 420 (e.g., a microprocessor, a digital signal processor, a microcontroller, an application specific integrated circuit, etc.), and optional internal memory 430.

For instance, the power source 410 is one or more removable battery packs. However, other substitute power sources may include a voltage controller to convert power received from a standard wall socket, a cigarette adapter of an automobile or other remote power sources over the connector port 290 of FIG. 2A. The processor 420 is adapted to internally process control information such as software modules downloaded from the computing device 110 of FIG. 1. The processor 420 may include non-volatile memory (not shown) for storage of the control information such as embedded instructions that, when executed, generate certain graphical representations. These instructions may be provided for execution by the processor 420 upon receipt of one or more commands from the computing device 110 of FIG. 1.

As an optional feature, separate internal memory 430 may be employed within the interactive electronic writing device 400. For one embodiment, the internal memory 430 may include non-volatile memory such as flash or battery-backed random access memory (RAM), which continues to store the control information even after power is discontinued or disrupted. Of course, the internal memory 430 may be volatile in nature or a combination of both volatile and non-volatile memories. The collective operations of the power source 410, processor 420 and perhaps the optional internal memory 430 may enable the interactive electronic writing device 400 to be portable and possibly operate independently from the computing device.

Referring now to FIG. 5, an exemplary block diagram of a flowchart featuring the operations of the interactive electronic writing device of FIG. 2C or 4 is shown. Initially, the interactive electronic writing device is coupled to the computing device and powered on (block 500). The interactive electronic writing device may be configured for control by and operating in concert with the computing device or downloading one or more software modules into memory located therein (block 510). Regardless of the configuration chosen, the interactive electronic writing device generates a light segment visible on its top surface in response to receiving control information from the computing device or executing downloaded software modules (blocks 520 and 530). This segment and other successive light segments guide the user as to a proper writing technique for reproducing a selected graphical representation being displayed (block 540). Hence, using the interactive electronic writing device, the user follows along visually or manually using a writing instrument to learn a writing sequence in order to reproduce a graphical representation. The interactive electronic writing device not only shows the shape of the graphical representation, but also demonstrates a proper method for reproducing the graphical representation, which can be any case, style or type of handwritten character or a customized object for example.

While certain exemplary embodiments have been described and shown in the accompanying drawings, it is to be understood that such embodiments are merely illustrative of and not restrictive on the broad invention, and that this invention not be limited to the specific constructions and arrangements shown and described. For example, it may be possible to implement the invention or some of its features in hardware, firmware, software or a combination thereof.

What is claimed is:

1. A device comprising:

a casing;

a screen located on one side of the casing, the screen being made of a semi-opaque material; and internal logic placed within the casing, the internal logic to control adjustment of a light beam directed at a bottom surface of the screen to temporarily illuminate a portion of the screen to successively display light segments forming a graphical representation in order to guide a user tracing the graphical representation also displayed on the screen as how to write the graphical representation.

2. The device of claim 1, wherein the internal logic comprises a light source to produce the light beam;

at least one mirror; and a plurality of galvanometers to control the at least one mirror for directing the light beam to the bottom surface of the screen.

3. The device of claim 2, wherein the internal logic further comprises a power source; and a processor coupled to the power source, the processor to control the plurality of galvanometers.

4. The device of claim 2, wherein the light source is a light emitting diode.

5. The device of claim 3, wherein the power source is at least one removable battery pack.

6. The device of claim 3, wherein the power source is a voltage controller to receive power from one of a cigarette lighter adapter of an automobile and a wall socket.

7. The device of claim 1, wherein the screen includes a phosphorous coating placed on the bottom surface of the screen.

8. The device of claim 1, wherein the at least one light segment is oriented with any selected degree of curvature.

9. The device of claim 8, wherein the at least one light segment is part of a cursive handwriting.

10. The device of claim 8, wherein the at least one light segment is part of any non-Roman character type.

11. The device of claim 8, wherein the at least one light segment is part of a portion of a drawing image.

12. A device comprising:

a casing;

a screen located on one side of the casing, the screen being made of a semi-opaque material; and internal logic placed within the casing, the internal logic to control adjustment of a light beam directed at a bottom surface of the screen to temporarily illuminate a portion of the screen to display at least one light segment to guide a user in writing a graphical representation on the screen, the internal logic comprises (i) a light source to produce the light beam, (ii) at least one mirror, and (iii) a plurality of galvanometers to control the at least one mirror for directing the light beam to the bottom surface of the screen, the plurality of galvanometers are controlled by a remotely located computer.

13. A method comprising:

providing an electronic writing device having a screen; and generating successive light segments visible on the screen of an electronic writing device to collectively form a selected graphical representation, the successive light segments being generated having a varying degree of illumination so that a most recent light segment generated having a highest degree of illumination and a least recent light segment generated having a lowest degree of illumination and the successive generation of light segments for guiding a user as to a proper writing technique for reproducing the selected graphical representation.

14. The method of claim 13, wherein the selected graphical representation being a Roman character type in a cursive handwriting style.

15. The method of claim 13, wherein the selected graphical representation is a non-Roman character.

16. The method of claim 13, wherein the selected graphical representation is drawing image.

17. The method of claim 13, wherein each light segment rendering an exact curvature across the entire light segment.

18. A software stored on a machine readable medium executed by at least one processor within an electronic device, the software, comprising:

a first software module to initialize and configure internal logic within the electronic device including a semi-opaque screen, the internal logic including a light source; and a second software module to control generation of successive light segments on a bottom surface of the screen visible from a top surface of the screen, the successive light segments collectively forming a selected graphical representation for guiding a user as to a proper writing technique for reproducing the selected graphical representation and being generated on a phosphorous coating on the bottom surface of the screen so that multiple light segments are visible at one time and have a varying degree of illumination.

19. The software of claim 18, wherein the selected graphical representation is a Roman character type in a cursive handwriting style.

20. The software of claim 18, wherein the selected graphical representation is a non-Roman character.

21. The software of claim 18, wherein the selected graphical representation is a drawing image.

\* \* \* \* \*

UNITED STATES PATENT AND TRADEMARK OFFICE
CERTIFICATE OF CORRECTION

PATENT NO. : 6,755,656 B2  
DATED : June 29, 2004  
INVENTOR(S) : Jelinek et al.

It is certified that error appears in the above-identified patent and that said Letters Patent is hereby corrected as shown below:

Column 4,  
Line 5, delete "300," and insert -- $300_1$ --.

Signed and Sealed this

Ninth Day of November, 2004

JON W. DUDAS  
*Director of the United States Patent and Trademark Office*